United States Patent
Robles Flores et al.

(10) Patent No.: US 10,882,347 B1
(45) Date of Patent: Jan. 5, 2021

(54) SECURITY MARKS BASED ON PRINT JOB IMAGE

(71) Applicant: Xerox Corporation, Norwalk, CT (US)

(72) Inventors: Eliud Robles Flores, Rochester, NY (US); Michael J. Martin, Hamlin, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/571,259

(22) Filed: Sep. 16, 2019

(51) Int. Cl.
| | |
|---|---|
| G06K 19/06 | (2006.01) |
| B41M 3/14 | (2006.01) |
| B42D 25/387 | (2014.01) |
| G06F 3/12 | (2006.01) |

(52) U.S. Cl.
CPC .......... B41M 3/144 (2013.01); B42D 25/387 (2014.10); G06F 3/1222 (2013.01); G06F 3/1238 (2013.01)

(58) Field of Classification Search
CPC .............. B41M 3/144; B41M 5/5254; B41M 2205/36; B41M 5/42; B41M 5/5218; B41M 5/5227; B41M 3/12; B41M 3/14; B41M 5/26; B41M 5/3275; B41M 5/3336; B42D 25/382; B42D 25/387; B42D 25/23; B42D 25/29; G06K 19/06037; G06K 15/02; G06K 2019/06225; G06F 3/1222; G06F 3/1238
See application file for complete search history.

(56) References Cited

U.S. PATENT DOCUMENTS

| | | | |
|---|---|---|---|
| 4,095,824 A | * | 6/1978 | Bachman ................. B41M 3/14 283/102 |
| 5,912,205 A | * | 6/1999 | Lakes ..................... B41M 3/14 503/207 |
| 5,935,694 A | | 8/1999 | Olmstead et al. |
| 6,987,868 B1 | * | 1/2006 | Atarashi ................. G07D 7/02 382/112 |
| 7,864,979 B2 | | 1/2011 | Fan et al. |
| 7,949,175 B2 | | 5/2011 | Fan |
| 8,009,329 B2 | | 8/2011 | Bala et al. |
| 8,147,900 B2 | | 4/2012 | Reichelsheimer et al. |
| 8,283,004 B2 | | 10/2012 | Bala et al. |
| 8,821,996 B2 | | 9/2014 | Bala et al. |
| 8,962,065 B2 | | 2/2015 | Dalai et al. |
| 9,611,403 B2 | | 4/2017 | Iftime et al. |
| 2004/0237822 A1 | | 12/2004 | Boland et al. |
| 2005/0219634 A1 | | 10/2005 | Murakami |
| 2005/0261401 A1 | | 11/2005 | Wood et al. |

(Continued)

OTHER PUBLICATIONS

U.S. Appl. No. 16/571,263, Office Action Communication dated Sep. 25, 2020, pp. 1-9.

*Primary Examiner* — Thien T Mai
(74) *Attorney, Agent, or Firm* — Gibb & Riley, LLC

(57) ABSTRACT

A printing system receives a print request containing patterns of marks to be printed on print media to produce printed output. A processor evaluates the print request to identify different printing densities of the patterns of marks. The processor alters the patterns of marks to create hidden features on the printed output by adding different printing densities of fluorescent spots to different areas of the patterns of marks. The different printing densities of the fluorescent spots are based on the different printing densities of the patterns of marks and on the size of the hidden features. A printing device prints the print request on the print media to produce the printed output.

20 Claims, 8 Drawing Sheets

(56) References Cited

U.S. PATENT DOCUMENTS

| | | |
|---|---|---|
| 2007/0092105 A1 | 4/2007 | Chiba et al. |
| 2008/0106768 A1 | 5/2008 | Fukuda et al. |
| 2009/0034009 A1* | 2/2009 | Johnson ............. H04N 1/32229 358/3.28 |
| 2010/0157377 A1 | 6/2010 | Zhao et al. |
| 2010/0296026 A1 | 11/2010 | Kubota et al. |
| 2011/0210994 A1* | 9/2011 | Derhak ................ G06K 15/027 347/6 |
| 2013/0128319 A1 | 5/2013 | Kenehan |
| 2013/0260991 A1* | 10/2013 | Van Boom ............... B41M 5/41 503/200 |
| 2014/0218762 A1* | 8/2014 | Abe ...................... G06F 3/1288 358/1.15 |
| 2014/0292888 A1 | 10/2014 | Terada |
| 2014/0294412 A1 | 10/2014 | Tanaka et al. |
| 2014/0369569 A1 | 12/2014 | Wicker et al. |
| 2015/0108224 A1* | 4/2015 | Greene ............. G06K 19/0672 235/492 |
| 2015/0193175 A1* | 7/2015 | Mori ....................... G06F 3/129 358/1.15 |
| 2016/0269587 A1* | 9/2016 | Garces ................. G06F 3/1254 |
| 2018/0032293 A1* | 2/2018 | Sakurai ................ G06F 3/1239 |
| 2020/0097236 A1* | 3/2020 | Miyadome ............ G06F 3/1259 |

\* cited by examiner

SECURITY MARKS BASED ON PRINT JOB IMAGE

CROSS-REFERENCE TO RELATED APPLICATIONS

The present invention is related to co-pending application entitled "SECURITY MARKS BASED ON PRINT JOB IMAGE WITH UNIFORM PRINTED BACKGROUND", U.S. application Ser. No. 16/571,263 filed on Sep. 16, 2019, the entire teachings of which are incorporated herein by reference.

BACKGROUND

Systems and methods herein generally relate to security printing and more particularly to creating hidden marks within an image of a print job.

Since the creation of the copy machine the authenticating and securing of documents is an area of interest in the printing industry. Watermarks of many kinds, typically in yellow toner or clear toner, have been used with some success. These rely on visible light effects such as gloss and reflectance. Microprinting is another security printing process, yet microprinting relies on the resolution and quality of the printer being used, and hence can be costly. The use of invisible toners/inks is typical for many security applications. Yet invisible inks/toners are "invisible" and can only be used for limited purposes.

In one example, security printing features can be elements of the document that do not appear in the original but do appear in a copy of the original, which allows the holder to recognize that they do not possess the original document. For example, the security printing features may reveal "copy" or "void" in a copy of an original. Such printing is a popular anti-counterfeiting and anti-forging method to protect valuable documents such as prescriptions and concert tickets. Other systems provide security printing that is visible only in the original, for example only when the original is viewed under special lighting conditions, such as ultraviolet (UV) light.

Regarding terminology for different types of light, as is understood by those ordinarily skilled in the art, "white light" generally means human-visible light such as daylight, artificial light sources (indoor/outdoor lights, mobile light sources), and is different from infrared light, ultraviolet light, etc.). Some fluorescent toners/inks (typically yellow, green or red) are designed to transform the invisible (non-human visible) component of light into human-visible light at a specific wavelength.

White light contains most (or all) human-visible colors, while ultraviolet light includes light wavelengths shorter than those within the spectrum of human-visible light. White light causes different colors to reflect differently from the original and the copy, while ultraviolet light causes only a single color to reflect. In one example, a typical UV (black) light is a single wavelength around 365-395 nm which is just under the visible range (400 nm). When ultraviolet light is shined on items that fluoresce, the fluorescent items reflects back light at a longer wavelength and therefore the fluorescent items stand out dramatically from the other non-fluorescent items that all appear dark violet.

The color reflected back under incident black light depends on the type of fluorescent wet or dry ink characterized by the longer wavelength. The fluorescent characteristic of fluorescent wet or dry ink will fluoresce in response to ultraviolet light much more than other ink or toner because standard inks and toners do not contain any (or only small amounts of) fluorescent material. For example, fluorescent inks can have 10×, 50×, 100×, etc., the fluorescence to ultraviolet light relative to standard inks and toners (e.g., RGB, CMYK, etc.). This causes fluorescent inks to appear much brighter, relative to areas of the print media that are covered with ink or toner, in response to ultraviolet light.

Also, relatively lighter fluorescent inks/toners (e.g., light yellow, white, light pink, etc.) have a color more similar to the sheets of media, than to the relatively darker non-fluorescent inks/toners used to form the pattern of marks of the printed image. Therefore, when the original is exposed to white light, the relatively lighter fluorescent inks/toners generally appear the same as the non-printing areas of the print job image to a human observer or camera.

Further, in security printing the fluorescent inks/toners are usually printed as small patches/spots that are spaced apart. This causes the fluorescent inks/toners to not be distinctly visible within the image, and instead the small and spaced fluorescent patches/spots visually merge together with the non-fluorescent inks/toners used to form the pattern of marks of the printed image (when the printed image is viewed without magnification). Thus, such small and spaced fluorescent patches/spots are not distinctly visible when viewed in white light, and such small and spaced fluorescent patches/spots merely tend to lighten the overall appearance of the printed image. However, these fluorescent patches/spots are formed in a pattern and at a sufficient density to form a clearly visible pattern of words, symbols, or other markings when the printed image is viewed under ultraviolet light.

SUMMARY

Various methods herein are performed using a printing system that can include a processor; and a printing device, a scanner, and a feeder, etc., in communication with the processor. The methods herein receive an initial print request that contains patterns of marks to be printed on print media, using the processor for example.

The methods identify different printing densities of the patterns of marks within the print request. For example, in some embodiments, these methods print the initial print request on the print media using the printing device to produce initial printed output. If so printed, these methods use the scanner to scan this initial printed output to produce a scan of the initial printed output. Such methods then use the processor to evaluate the scan of the initial printed output to identify different printing densities of the patterns of marks in the image on the initial printed output. In other embodiments, rather than printing and scanning the initial print request, the processor may simply be used to evaluate the image within the print request to identify the different printing densities of the patterns of marks within the print request itself.

With this, the methods herein use the processor to alter the patterns of marks in the initial print request to create a revised print request that has hidden features. More specifically, in this processing the methods alter the patterns of marks in the initial print request by adding different printing densities of fluorescent spots to different areas of the patterns of marks. The different printing densities of such fluorescent spots are created based upon the different printing densities of the patterns of marks and based upon the size of the hidden features.

In greater detail, the processor is used in these methods to add relatively higher printing densities of the fluorescent spots to areas of the patterns of marks having relatively higher printing densities and add relatively lower printing densities of the fluorescent spots to areas of the patterns of marks having relatively lower printing densities. Also, these methods add relatively lower printing densities of the fluorescent spots to the different areas of the patterns of marks as relative feature sizes of the hidden features formed by the fluorescent spots increases. In other words, such methods establish/create the different printing densities of the fluorescent spots relative to the different printing densities of the patterns of marks and relative to the size of the hidden features to cause the hidden features to only be visible when viewed under ultraviolet light.

In additional embodiments, these methods can use the processor to identify different areas of the pattern of marks that are not to receive the hidden features because the printing density and/or printing gamut makes those areas poor candidates for hidden features.

The methods use the printing device to print the revised print request, after the processor alters the pattern of marks, to produce revised printed output. The methods also use the same (or a different) scanner to scan the revised printed output to produce a scan of the revised printed output. The methods can then use the processor to determine whether the hidden features are visible in the scan of the revised printed output. Additionally, this process can be iterative, so the methods can repeat the process of altering the patterns of marks by reducing the printing densities of the fluorescent spots so long as the hidden features remain visible in each successive scan of the revised printed output during each iteration.

The methods can also use the processor to determine whether the revised print request is to be utilized or not based on whether the hidden features are visible in the scan of the revised printed output (potentially without any additional iterations). With this, the methods can use the printing device to print either the initial print request or the revised print request (e.g., as a production run print job). Further, the methods can use the feeder to discard the initial printed output, if it is not used.

Various printing systems herein perform such methods and such systems include, among other components, a processor; and a printing device, a scanner, and a feeder, etc., in communication with the processor. The processor can be, for example, adapted to receive the initial print request that contains the patterns of marks to be printed on the print media.

Again, these devices evaluate the print request to identify the different printing densities of the patterns of marks within the image in the print request. In some embodiments, the printing device is adapted to print the initial print request on the print media to produce initial printed output and the internal scanner is adapted to scan this initial printed output to produce a scan of the initial printed output. The processor is then adapted to evaluate the scan of the initial printed output to identify different printing densities of the patterns of marks in the image on the initial printed output. In other embodiments, rather than printing and scanning the initial print request, the processor may simply evaluate the received print request to identify the different printing densities of the patterns of marks within the image in the print request itself.

With this, the processor is adapted to alter the patterns of marks in the initial print request to create a revised print request that has hidden features. More specifically, the processor alters the patterns of marks in the initial print request by adding different printing densities of fluorescent spots to different areas of the patterns of marks. Again, the different printing densities of such fluorescent spots are formed/created based on the different printing densities of the patterns of marks and on the size of the hidden features.

In greater detail, the processor is adapted to add relatively higher printing densities of the fluorescent spots to areas of the patterns of marks having relatively higher printing densities and add relatively lower printing densities of the fluorescent spots to areas of the patterns of marks having relatively lower printing densities. Also, the processor is adapted to add relatively lower printing densities of the fluorescent spots to the different areas of the patterns of marks as the relative feature sizes of the hidden features formed by the fluorescent spots increases. In other words, the processor is adapted to establish the different printing densities of the fluorescent spots relative to the different printing densities of the patterns of marks and the size of the hidden features to cause the hidden features to only be visible when viewed under ultraviolet light.

This process can be iterative, so the processor is adapted to iteratively repeat the process of altering the patterns of marks by incrementally reducing the printing densities of the fluorescent spots so long as the hidden features remain visible in the scan of the initial printed output. In additional embodiments, the processor can be adapted to identify different areas of the pattern of marks that are not to receive the hidden features because the printing density and/or printing gamut makes those areas poor candidates for hidden features.

The printing device is then adapted to print the revised print request after the processor alters the pattern of marks to produce revised printed output. The same (or a different) internal scanner is adapted to scan the revised printed output to produce a scan of the revised printed output. The processor is adapted to determine if the revised print request is to be utilized based on whether the hidden features are visible in the scan of the revised printed output. With this, the printing device is adapted to print either the initial print request or the revised print request as a production run print job based on whether the revised print request is to be utilized. Further, the feeder is adapted to discard the initial printed output if it is not used.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, in some security printing the difference between the printing pattern of the original and the marks printed with fluorescent inks is only visible when the original is exposed to ultraviolet light because the fluorescent inks fluoresce greatly relative to the other inks/toners; and in contrast, under white light the fluorescent inks blend with the other colors and are not visible to the user. The systems described below use a special toner, a camera/scanner system that returns real time image content, and a workflow that uses that image content to determine where and how much toner to apply to the image to make hidden marks/printing when needed.

More specifically, the systems/methods herein use a fluorescent toner, an image-based system, and a workflow to produce and validate the printing of hidden marks that allows inspection of the printed output real time. The system scans the image in the paper path being printed, compares that image to the source, and marks any differences as defects. The system can also stop when a defect is found and re-print the job defect free. The workflow determines image content (color, solids, halftones, etc.) and that information is then used to map security/invisible marks at appropriate halftone levels that best suits the image content.

Figure 1:
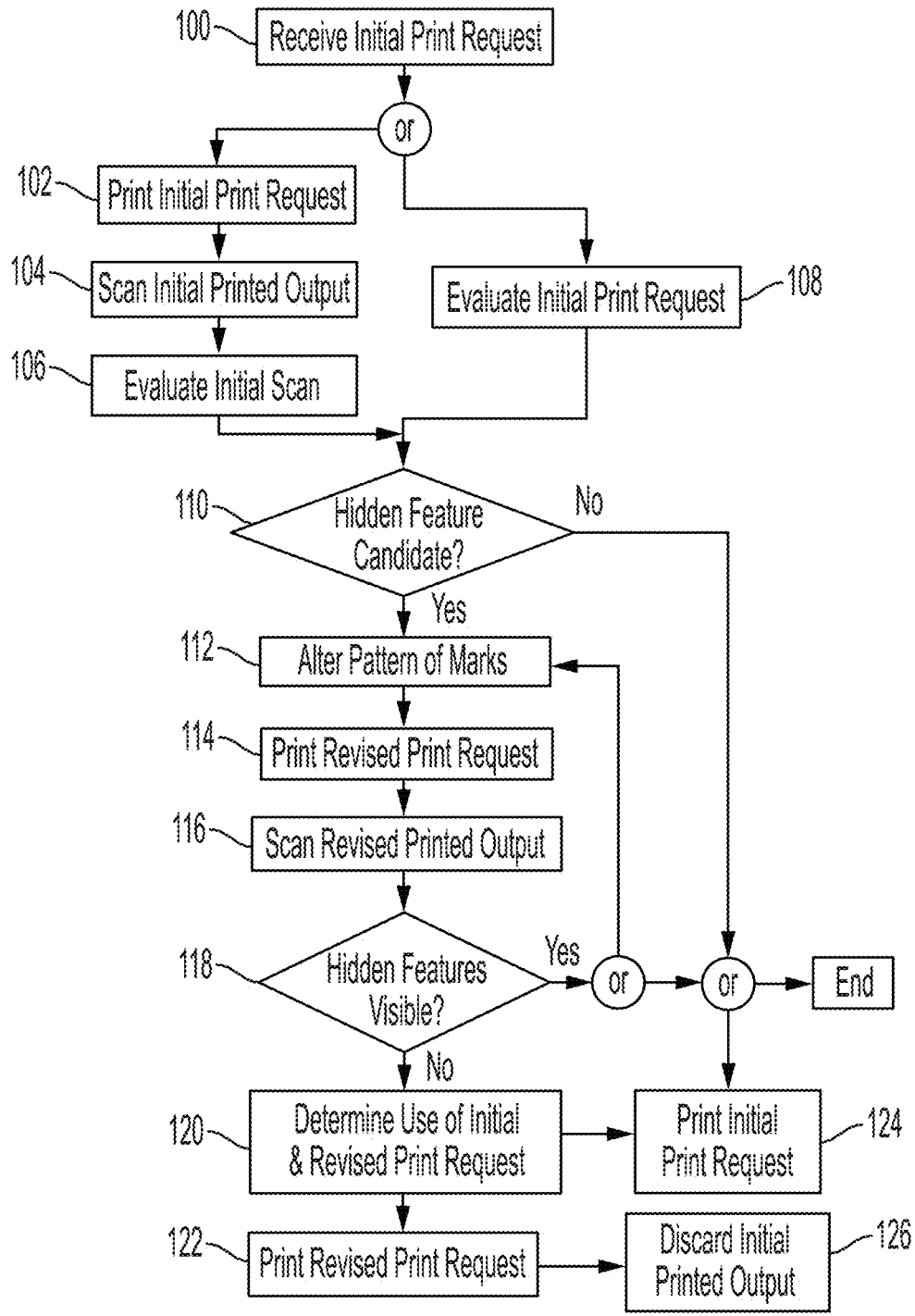
FIG. 1 is a flow diagram of various methods herein.

In greater detail, FIG. 1 is flowchart illustrating exemplary methods herein. Various methods herein are performed using a printing system that can include, for example, a processor; and a printing device, a scanner, and a feeder in communication with the processor and such methods are fully automatic (with every process described herein being performed automatically by machine without any human intervention) or partially automatic and partially manual. As shown in item 100, the methods herein receive, using the processor for example, an (initial) print request (e.g., copy job, print job, production job, etc.) that contains patterns of marks to be printed on print media.

The methods identify different printing densities of the patterns of marks within the print request. For example, in some embodiments (as shown in item 102) these methods print the initial print request on the print media using the printing device to produce initial printed output. If so printed, in item 104 these methods use the scanner (potentially an internal scanner of the printing device) to scan this initial printed output to produce a scan of the initial printed output. In item 106, such methods then use the processor to evaluate the scan of the initial printed output to identify different printing densities of the patterns of marks on the initial printed output. In other embodiments, rather than printing 102 and scanning 104 the initial print request, the processor may simply be used to evaluate the print request in item 108 to identify the different printing densities of the patterns of marks within the print request itself.

Based on the processing in items 106 and 108, these methods can then compare the printing densities of the patterns of marks and the printing gamut (e.g., darkness) of such patterns of marks to known standards to determine whether any aspects of the print request is a viable candidate for adding hidden features in item 110.

Regarding such known standards, in some images the printing density and the color of the pattern of marks may cause portions of images or entire images to be poor candidates for hidden features. For example, poor candidates may have sufficiently high print density and/or sufficiently dark marks as to require such a high printing density of fluorescent spots for visibility under ultraviolet light that the fluorescent spots will also be visible under white light. Therefore, there will be some situations where the dark color and high printing density of the pattern of marks prohibits hidden features from being formed.

In view of this, the systems and methods herein evaluate the full image that the initial print request creates on the printed output using the patterns of marks. Some of the areas of the image may not be good candidates for the hidden features, while other areas of the image may be good candidates for the hidden features. Therefore, the systems and methods herein limit the areas of the printed output in which hidden features can be formed to only the good candidate areas. Further, there may be some print requests that contain very little or no good candidate areas, and those are considered as being poor candidates in an item 110, as described above.

If the print request is a viable candidate for adding hidden features, then in item 112 the methods herein use the processor to alter the patterns of marks in the initial print request to create a revised print request that has hidden features. If not, processing ends, or the initial print request is simply printed without modification in item 124.

More specifically, in the processing in item 112 the methods alter the patterns of marks in the initial print request by adding different printing densities of fluorescent spots to different areas of the patterns of marks. The locations of, and different printing densities of, such fluorescent spots are based on (e.g., varied, controlled, changed, established, etc.) the different printing densities of the patterns of marks and based on the size of the hidden features formed by the pattern of the fluorescent spots.

For purposes herein, the fluorescent "spots" could by any shape and size, such as round, rectangles, polygons, curved shaped features, etc. (e.g., dots, squares, patches, etc.). Additionally, each fluorescent spot can be large enough to be printed using multiple pixels of a printing system (or a single pixel). Therefore, the printing density of the fluorescent spots can refer to the percentage of pixels print per unit area used to print each fluorescent spot (e.g., halftone percentage, area coverage percentage, ink/toner amount per spot, fluorescent spot concentration, etc.). In other embodiments, the printing density of the fluorescent spot can refer to how many fluorescent spots are printed per unit area, such as per inch, per millimeter, per dot, (which can also be referred to as the density of fluorescent spots per unit area of the image, fluorescent spot pitch, fluorescent spot density).

In greater detail, in item 112 the processor is used in these methods to add relatively higher printing densities of the fluorescent spots to areas of the patterns of marks that have relatively higher printing densities (same nomenclature as above) and add relatively lower printing densities of the fluorescent spots to areas of the patterns of marks that have relatively lower printing densities. Also, in item 112 these methods add relatively lower printing densities of the fluorescent spots to the different areas of the patterns of marks as relative feature sizes (font size, character size, graphic size, etc.) of the hidden features formed by the fluorescent spots increases.

These methods also use the information from item 110 regarding the areas of the image identified as good/poor candidates for the hidden features to select areas of the pattern of marks that are, and are not, to receive the hidden features in item 112. In other words, in items 110, 112 such methods establish the locations of, and printing densities of, the fluorescent spots based upon the different printing densities of the patterns of marks in the image in the print request, and based on the size of the hidden features formed by the fluorescent spots, to cause the hidden features to only be visible when viewed (in the human spectrum, unmagnified) under ultraviolet light, and not visible under white light.

Thus, the systems and methods herein use different densities of the fluorescent spots in different areas of the same image in order to allow the fluorescent spots to be easily seen when viewed with ultraviolet light but not seen when viewed with white light. The ability to see the fluorescent spots in ultraviolet and white light changes depending upon whether the fluorescent spots are added to lightly printed (low print density) patterns of marks within the initial print request or heavily printed (high print density) patterns of marks, as well as whether the fluorescent spots are printed within patterns of marks having light colors (e.g., yellow, pink, orange, light brown, light blue etc.) or patterns of marks having dark colors (e.g., black, dark brown, dark blue, gray, etc.).

In other words, for a relatively higher printing density of the (non-fluorescent) pattern of marks within the initial print request, a relatively higher printing density of fluorescent spots is needed in order to allow the fluorescent spots to stand out from the pattern of marks under ultraviolet light. However, the printing density of the fluorescent spots must not be increased too much, in order to prevent the fluorescent spots from being visible in white light. The same holds true for relatively darker colors within the initial print request, which require a relatively higher printing density of the fluorescent spots to allow the fluorescent spots to be more easily seen under ultraviolet light (again as limited by the need to not increase the printing density of the fluorescent spots so high as to cause the fluorescent spots to also be visible under white light). In contrast, the fluorescent spots more easily stand out within relatively lower density, lighter non-fluorescent colors, allowing/mandating lower densities of fluorescent spots, so that the fluorescent spots stand out from the pattern of marks under ultraviolet light, yet are not be visible in white light.

While other terminology could be utilized to describe printing density, in the examples below, printing density of the pattern of marks in the print request is described using halftone (HT) or area coverage (AC) percentages. These percentages are the percentage of pixels that print relative to those pixels that do not print within a given area of the image or within a given fluorescent spot. Therefore, the higher the percentage, the greater number of pixels print within a given area.

In one example, fluorescent yellow dry ink can be used, and the following optional settings can be established. In this example, for marks in areas of the initial print request (e.g., image content) that have greater than 95% printing density of a dark gamut (e.g., black), hidden features are not suitable; for marks in the area of the initial print request between 80-95% printing density of a dark gamut, hidden features are printed using 50% printing density for the fluorescent spots; for marks in the area of the initial print request between 25-50% area coverage of a dark gamut, hidden features are printed using 25% printing density for the fluorescent spots; for marks in the area of the initial print request less than 25% area coverage of a dark gamut, hidden features are printed using 10% printing density for the fluorescent spots. Note that in the foregoing example, those ordinarily skilled in the art would understand that other settings could be established for similar or different color fluorescent inks, depending upon the paper utilized, the printer, the security application, etc.

In item 114, the methods use the printing device to print the revised print request, after the processor alters the pattern of marks, to produce revised printed output. These methods also use the scanner in item 116 to scan the revised printed output under white light to produce a scan of the revised printed output. In item 118, these methods use the processor to determine whether the hidden features are visible in the scan of the revised printed output. As shown in FIG. 1, if the hidden features are visible, processing can end, or the initial print request can be printed without modification in item 124.

Additionally, this processing can be iterative. Therefore, as shown in the return arrow from item 118 to item 112 in FIG. 1, if the hidden features are visible in the scan of the revised printed output in item 118, processing can flow back to item 112 to allow these methods to repeat the process of altering the patterns of marks (112) by incrementally reducing (or further reducing in subsequent iterations) the printing densities of the fluorescent spots. This iterative processing can be omitted or can be repeated until the hidden features are no longer visible in the scan of the revised printed output. Additionally, a minimum printing density of the fluorescent spots can be set to limit how many iterations are performed. For example, the minimum printing density can be a limit below which the hidden features are too faint and are no longer reliably visible under ultraviolet light. If this minimum printing density of the fluorescent spots is reached but the hidden features are still visible, this indicates that the affected portion of the pattern of marks (or the entire pattern of marks) is not a viable hidden feature candidate and processing can end or the initial print request can be printed without modification in item 124.

Next, in item 120, the methods can then use the processor to determine if the revised print request is to be utilized at all, based on whether the hidden features are visible in the scan of the revised printed output 118 (possibly when the minimum printing density has been reached in the iterations, etc.). Therefore, in item 120, these methods can rate how good of a candidate the pattern of marks is for hidden features based on the how close the printing density of the fluorescent spots is to the minimum printing density (being closer to the minimum reduces candidate quality rank), how much area of image formed by the pattern is a good hidden feature candidate (less useful area reduces candidate quality rank), whether the desired size of the hidden features will fit within the good hidden feature candidate areas of the pattern of marks, how well the hidden features stand out under ultraviolet light (once the hidden features are not visible in item 118), etc. With this, the methods can use the printing device to print either the revised print request 122 or the initial print request 124 as a production run print job based on whether the revised print request is to be utilized in item 120. Further, in item 126 the methods can use the feeder to discard the initial printed output if it is not used.

Figure 2:
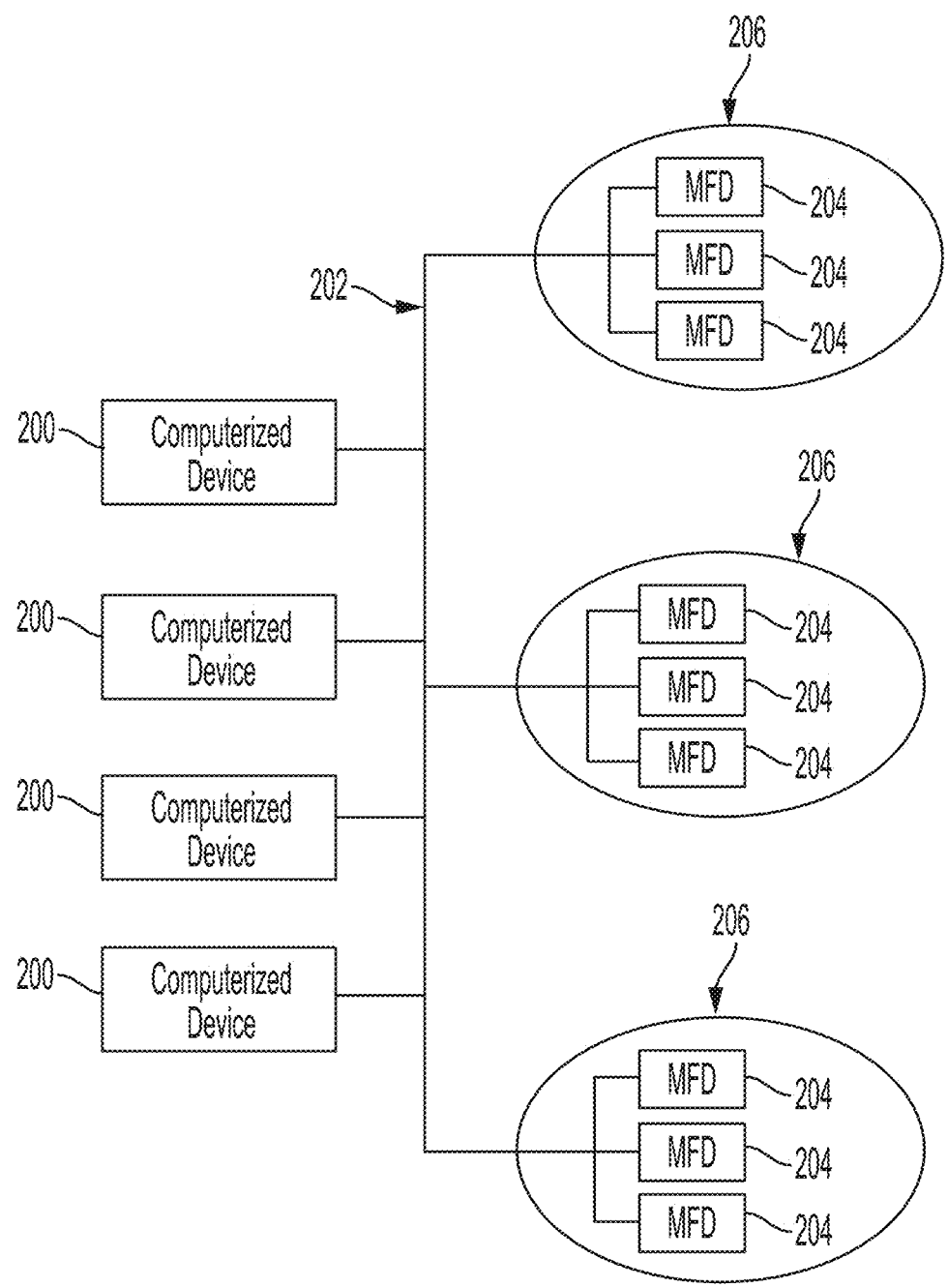
FIG. 2 is a schematic diagram illustrating systems herein.

As shown in FIG. 2, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
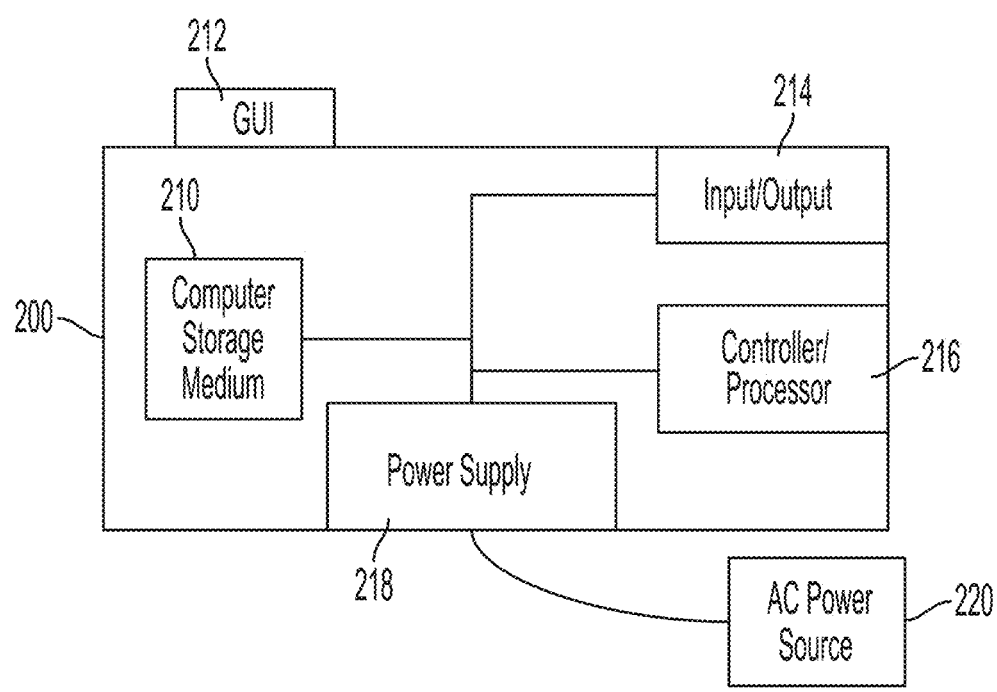
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc.), etc.

Figure 4:
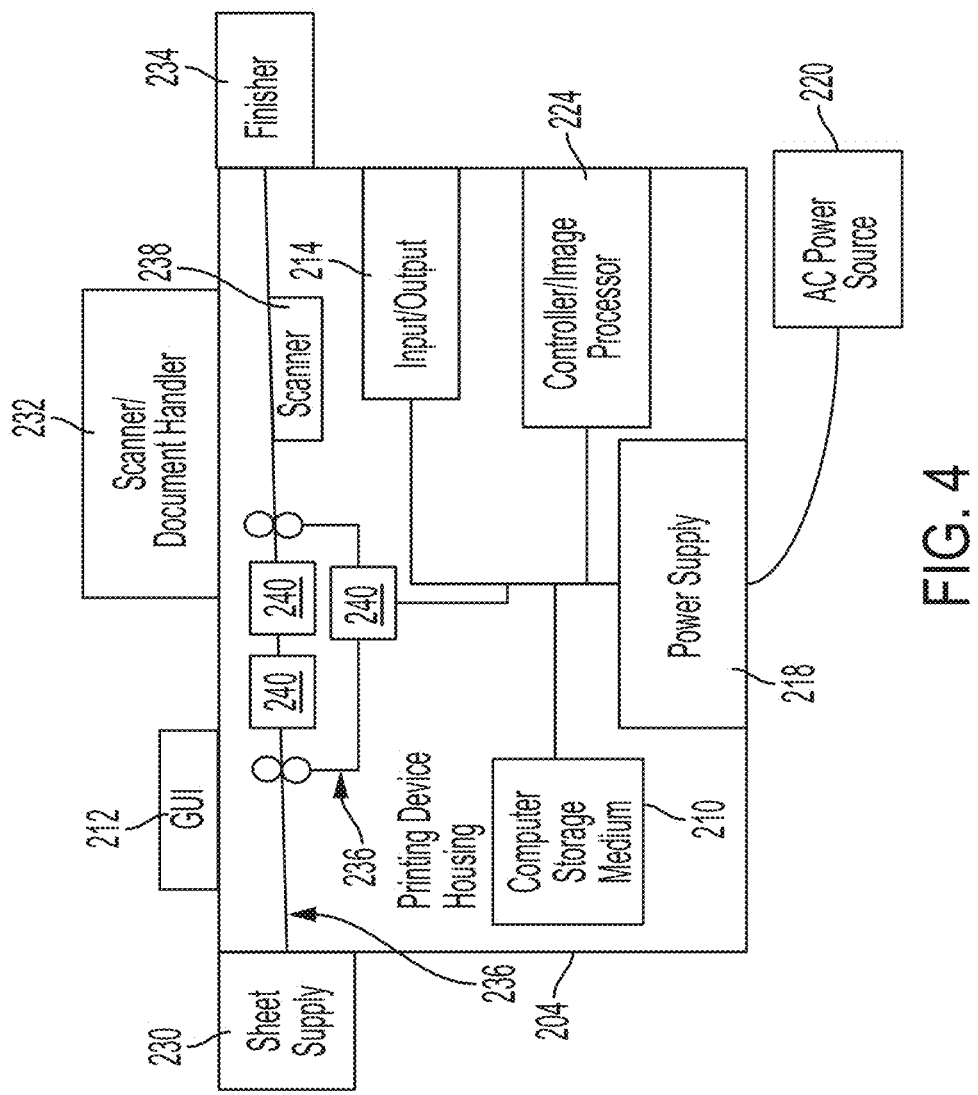
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 4 is only one example and the systems and methods herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with systems and methods herein.

Thus, printing systems herein include, among other components, a processor 216, 224; and a printing device 204, 240, an external scanner 232, an internal scanner 238, and a feeder 236 in communication with the processor 216, 224. The processor 216, 224 is, for example, adapted to receive an initial print request that contains patterns of marks to be printed on print media. Again, all processes described can be fully automatic or partially manual, partially automatic.

In some embodiments, the printing device 204, 240 is adapted to print the initial print request on the print media to produce initial printed output and the scanner 232, 238 is adapted to scan this initial printed output to produce a scan of the initial printed output.

The processor 216, 224 is then adapted to evaluate the scan of the initial printed output to identify different printing densities of the patterns of marks in the initial printed output. In other embodiments, rather than printing and scanning the initial print request, the processor 216, 224 may simply evaluate the print request itself (e.g., the electronic file data) to identify the different printing densities of the patterns of marks within the print request, without performing any printing.

With this, the processor 216, 224 is adapted to alter the patterns of marks in the initial print request to create a revised print request that has hidden features. More specifically, the processor 216, 224 alters the patterns of marks in the initial print request by adding different printing densities of fluorescent spots to different areas of the patterns of marks. The different printing densities of such fluorescent spots are based on the different printing densities of the patterns of marks and on the size of the hidden features.

In greater detail, the processor 216, 224 is adapted to add relatively higher printing densities of the fluorescent spots to areas of the patterns of marks having relatively higher printing densities of the patterns of marks and add relatively lower printing densities of the fluorescent spots to areas of the patterns of marks having relatively lower printing densities of the patterns of marks. Also, the processor 216, 224 is adapted to add relatively lower printing densities of the fluorescent spots to the different areas of the patterns of marks as relative feature sizes of the hidden features formed by the fluorescent spots increases. In other words, the processor 216, 224 is adapted to establish the different printing densities of the fluorescent spots relative to the different printing densities of the patterns of marks and the size of the hidden features to cause the hidden features to only be visible when viewed under ultraviolet light.

The printing device 204, 240 is then adapted to print the revised print request after the processor 216, 224 alters the pattern of marks to produce revised printed output. The scanner 232 is adapted to scan the revised printed output to produce a scan of the revised printed output. The processor 216, 224 is adapted to determine if the revised print request is to be utilized based on whether the hidden features are visible in the scan of the revised printed output.

This process can be iterative, so the processor 216, 224 is adapted to repeat altering the patterns of marks by reducing the printing densities of the fluorescent spots based on the hidden features being visible in the scan of the initial printed output. In additional embodiments, the processor 216, 224 can be adapted to identify ones of the different areas of the pattern of marks that are not to receive the hidden features because the printing density and/or printing gamut makes those areas poor candidates for hidden features.

With this, the printing device 204, 240 is adapted to print either the initial print request or the revised print request as a production run print job based on whether the revised print request is to be utilized. Further, the feeder 236 is adapted to discard the initial printed output if it is not used. Note that, depending upon the diversity of ink/toner storage and print heads, the printer may print the fluorescent and non-fluorescent marks in a single (the same) printing pass, or in multiple printing passes.

Figure 5:
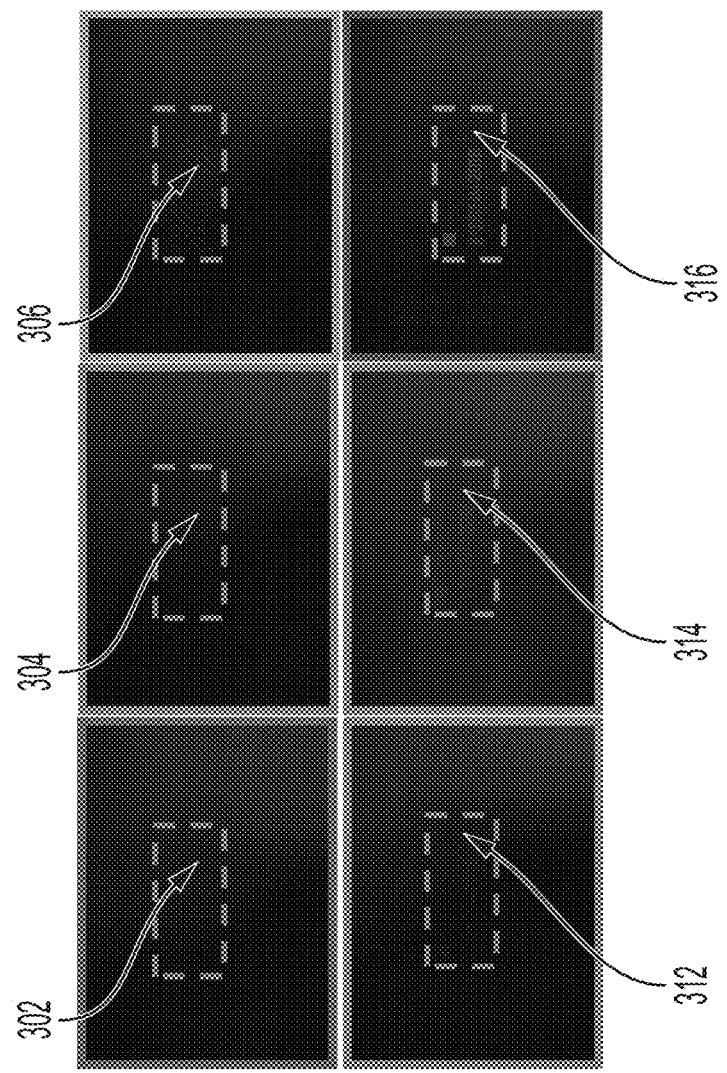
FIGS. 5 and 6 are images illustrating printing output produced by methods and devices herein.
Figure 6:
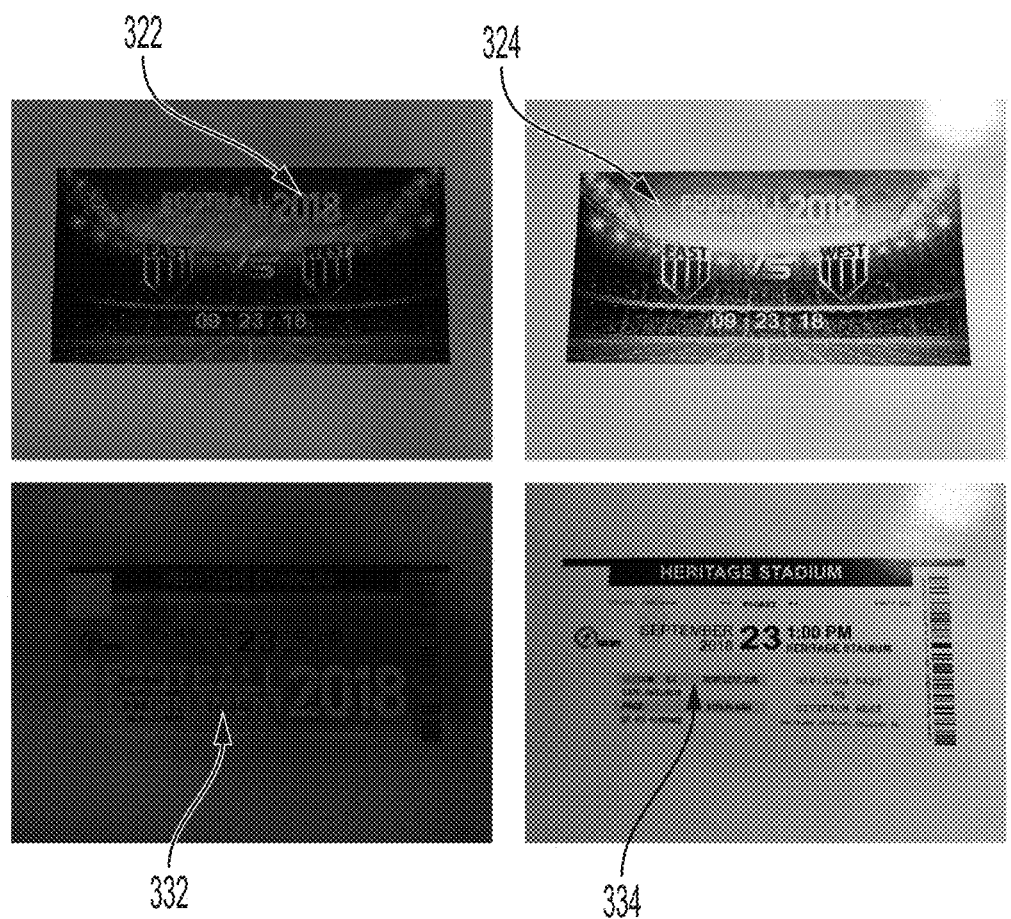

FIGS. 5 and 6 illustrate examples of different output produced by methods and systems herein. FIG. 5 shows the same background pattern of marks viewed under ultraviolet light with added: relatively lower density fluorescent spots 302, 312; relatively somewhat higher density fluorescent spots 304, 314; and relatively even higher density fluorescent spots 306, 316. The fluorescent spots 302, 304, 306 have smaller features relative to the feature sizes of the hidden features formed by the fluorescent spots 312, 314, 316.

As shown in FIG. 5, both feature sizes of the relatively lower density fluorescent spots 302, 312 are only visible when viewed under ultraviolet light, and are only slightly visible under ultraviolet light, if at all. Similarly, the relatively somewhat higher density fluorescent spots 304, 314 are only visible when viewed under ultraviolet light, but are move visible under ultraviolet light than fluorescent spots 302, 312. Note that, as shown in FIG. 5, the smaller-size features of the fluorescent spots 304 causes them to be only slightly visible under ultraviolet light; while, in contrast, the larger feature size of the fluorescent spots 314 allows them to be more easily seen under ultraviolet light. The increased printing density of the small feature size fluorescent spots 306 allows them to be more easily seen; however, again only when viewed with ultraviolet light. However, the increased printing density of the larger feature size fluorescent spots 316 causes them to be visible under both ultraviolet and white light, making the printing density and feature size of the larger feature fluorescent spots 316 a poor candidate for hidden features within this pattern of marks.

FIG. 6 shows some real-world examples of using methods and systems herein. Items 322 and 324 show the same sporting event ticket viewed under ultraviolet light (322) and white light (324). As can be seen in FIG. 6, hidden text "Official Ticket" can be only seen when the ticket is viewed with ultraviolet light 322 and not when viewed with white light 324. Similarly, items 332 and 334 show the same sporting event ticket viewed under ultraviolet light (332) and white light (334). As can be seen in FIG. 6, hidden text "Football Tournament 2018" can be only seen when the ticket is viewed with ultraviolet light 332 and is not seen when viewed with white light 334.

Figure 7B:
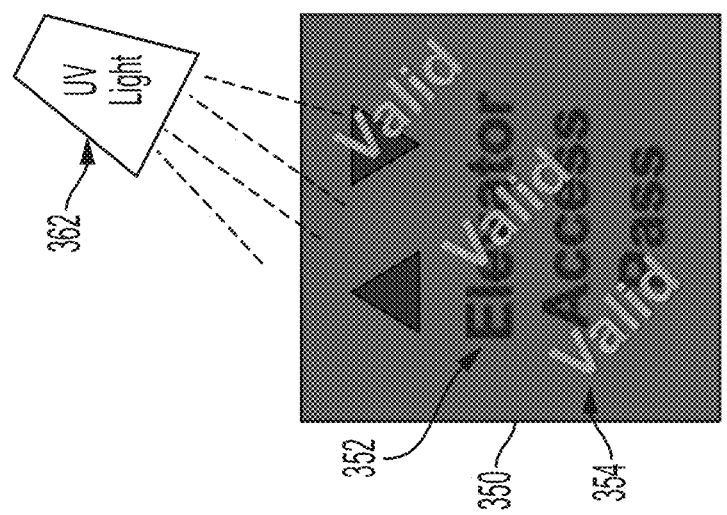
FIGS. 7A-7B are schematic diagrams illustrating printed output produced by methods and devices herein.
Figure 7A:
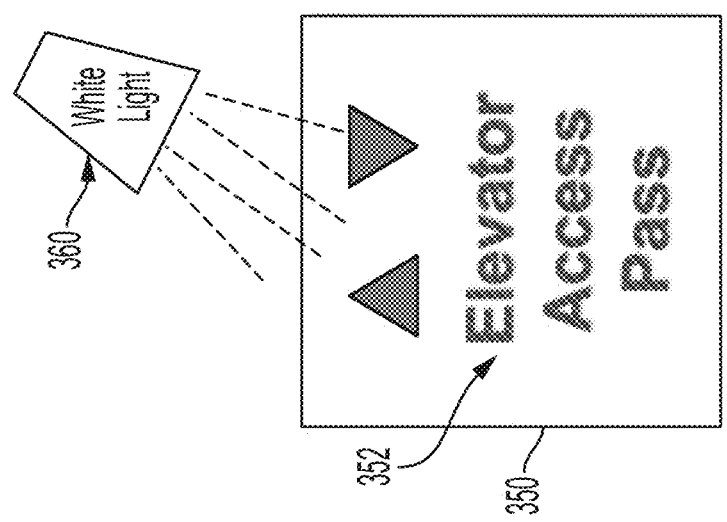

FIGS. 7A-7B show a different exemplary image (that could be included within a print request) on printed output 350, 358. The image and printed output 350, 358 include a pattern of markings 352 that forms up and down arrow marks and the words "Elevator Access Pass." FIG. 7A shows the printed output 350 when viewed under white light 360. FIG. 7B illustrates the same printed output 350 shown in FIG. 7A but when viewed under ultraviolet light 362, which allows the hidden text 354 (the repeating word "valid") to be slightly visible.

Figure 8B:
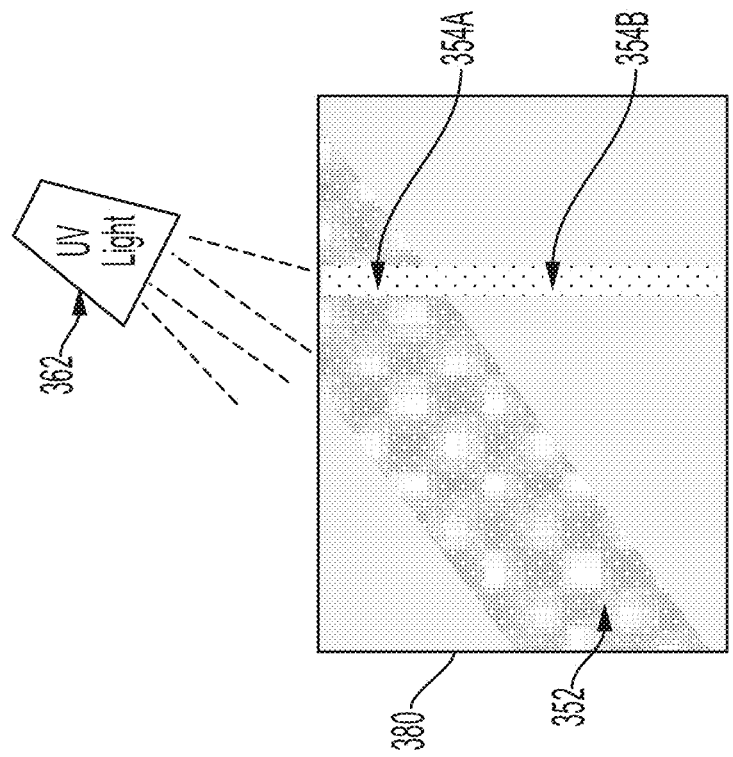
FIGS. 8A-8B are schematic diagrams illustrating greatly magnified portion of a printed output produced by methods and devices herein.
Figure 8A:
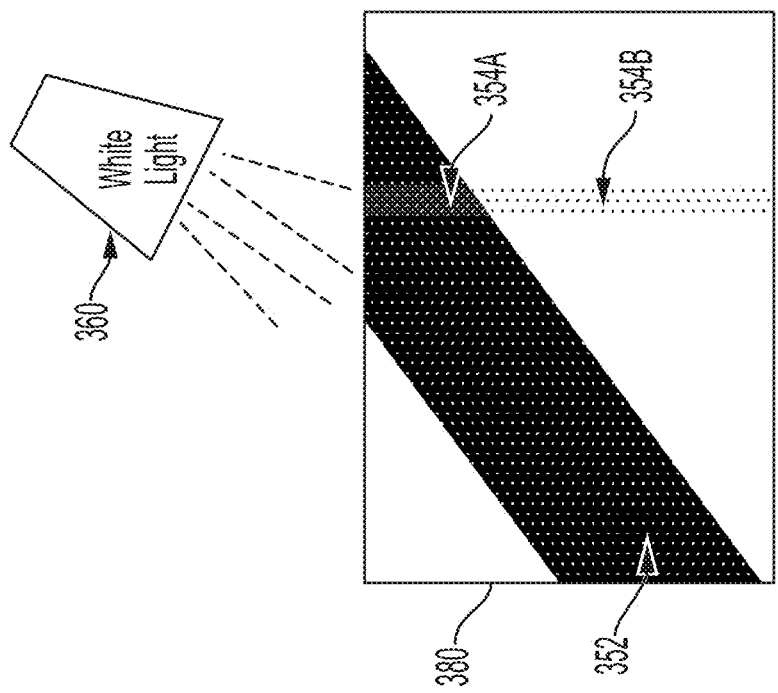

FIGS. 8A-8B illustrate a greatly magnified portion of a printed output 380 that includes a portion of a pattern of marks 352 and fluorescent spots forming hidden features 354A, 354B. The magnified printed output 380 is shown at a magnification much greater than that obtainable with unaided human vision. Note that in FIGS. 8A-8B the magnification is great enough to allow the halftoning utilization to be observed where continuous marks are not formed on the print media, button instead closely spaced dots or spots form the different marks shown on the printed output 380. FIG. 8A illustrates the magnified printed output 380 viewed under white light 360, while FIG. 8B illustrates the magnified printed output 380 viewed under ultraviolet light 362.

As can be seen under magnification in FIG. 8A, the printing density of the hidden features 354A, 354B is different in the areas 354A where the pattern of marks 352 exist and the non-marking areas 354B. As noted above, the hidden features 354A have a higher density of fluorescent spots in areas where the pattern of marks 352 exist, relative to the hidden features 354B in non-marking areas, and this allows the hidden features 354A to stand out more prominently from the pattern of marks 352 when viewed under ultraviolet light (as shown in FIG. 8B). However, as can be seen in FIG. 8A, the fluorescent spots forming the hidden features 354A, 354B disturb the background and pattern of marks 352 only slightly, and such is not visible when the printed output is viewed under white light 360 without the magnification shown in FIG. 8A.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/ output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image.

An image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone (continuous tone) is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning refers to a process of representing a contone image as a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink).

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing system comprising:
a processor adapted to evaluate a print request to identify different printing densities of patterns of marks in the print request to be printed on print media to produce printed output; and
a printing device in communication with the processor, wherein the processor is adapted to alter the patterns of marks to create hidden features on the printed output by adding different printing densities of fluorescent spots to different areas of the patterns of marks, wherein the different printing densities of fluorescent spots are based on the different printing densities of the patterns of marks and on a size of the hidden features, and
wherein the printing device is adapted to print the print request on the print media to produce the printed output after the processor alters the patterns of marks.

2. The printing system according to claim 1, wherein the processor is adapted to add relatively higher printing densities of the fluorescent spots to areas of the patterns of marks having relatively higher printing densities of the patterns of marks and add relatively lower printing densities of the fluorescent spots to areas of the patterns of marks having relatively lower printing densities of the patterns of marks.

3. The printing system according to claim 1, wherein the processor is adapted to add relatively lower printing densities of the fluorescent spots to the different areas of the patterns of marks as relative feature sizes of the hidden features formed by the fluorescent spots increases.

4. The printing system according to claim 1, wherein the processor is adapted to establish the different printing densities of the fluorescent spots relative to the different printing densities of the patterns of marks and the size of the hidden features to cause the hidden features to only be visible when viewed under ultraviolet light.

5. The printing system according to claim 1, wherein the processor is adapted to identify ones of the different areas of the pattern of marks to not receive the hidden features based on the printing density and printing gamut of the different areas of the pattern of marks.

6. The printing system according to claim 1, further comprising a scanner in communication with the processor,
   wherein the scanner is adapted to scan the printed output to produce a scan of the printed output;
   wherein the processor is adapted to determine if the hidden features are visible in the scan of the printed output; and
   wherein the processor is adapted to repeat altering the patterns of marks by reducing printing densities of the fluorescent spots based on the hidden features being visible in the scan of the printed output.

7. The printing system according to claim 6, further comprising a feeder in communication with the processor,
   wherein the feeder is adapted to discard the printed output based on the hidden features being visible in the scan of the printed output; and
   wherein the printing device is adapted to repeat printing the print request after the printing densities of the fluorescent spots have been reduced.

8. A printing system comprising:
   a processor adapted to receive an initial print request containing patterns of marks to be printed on print media;
   a printing device in communication with the processor, wherein the printing device is adapted to print the initial print request on the print media to produce initial printed output; and
   a scanner in communication with the processor,
   wherein the scanner is adapted to scan the initial printed output to produce a scan of the initial printed output,
   wherein the processor adapted to evaluate the scan of the initial printed output to identify different printing densities of the patterns of marks in the initial printed output,
   wherein the processor is adapted to alter the patterns of marks in the initial print request to create a revised print request having hidden features by adding different printing densities of fluorescent spots to different areas of the patterns of marks, wherein the different printing densities of fluorescent spots are based on the different printing densities of the patterns of marks and on a size of the hidden features,
   wherein the printing device is adapted to print the revised print request after the processor alters the pattern of marks to produce revised printed output,
   wherein the scanner is adapted to scan the revised printed output to produce a scan of the revised printed output,
   wherein the processor is adapted to determine if the revised print request is to be utilized based on whether the hidden features are visible in the scan of the revised printed output, and
   wherein the printing device is adapted to print either the initial print request or the revised print request as a production run print job based on whether the revised print request is to be utilized.

9. The printing system according to claim 8, wherein the processor is adapted to add relatively higher printing densities of the fluorescent spots to areas of the patterns of marks having relatively higher printing densities of the patterns of marks and add relatively lower printing densities of the fluorescent spots to areas of the patterns of marks having relatively lower printing densities of the patterns of marks.

10. The printing system according to claim 8, wherein the processor is adapted to add relatively lower printing densities of the fluorescent spots to the different areas of the patterns of marks as relative feature sizes of the hidden features formed by the fluorescent spots increases.

11. The printing system according to claim 8, wherein the processor is adapted to establish the different printing densities of the fluorescent spots relative to the different printing densities of the patterns of marks and the size of the hidden features to cause the hidden features to only be visible when viewed under ultraviolet light.

12. The printing system according to claim 8, wherein the processor is adapted to identify ones of the different areas of the pattern of marks to not receive the hidden features based on the printing density and printing gamut of the different areas of the pattern of marks.

13. The printing system according to claim 8, wherein the processor is adapted to repeat altering the patterns of marks by reducing the printing densities of the fluorescent spots based on the hidden features being visible in the scan of the initial printed output.

14. The printing system according to claim 8, further comprising a feeder in communication with the processor,
   wherein the feeder is adapted to discard the initial printed output.

15. A method comprising:
   receiving, into a printing system, a print request containing patterns of marks to be printed on print media to produce printed output;
   evaluating the print request using a processor of the printing system to identify different printing densities of the patterns of marks;
   altering the patterns of marks using the processor to create hidden features on the printed output by adding different printing densities of fluorescent spots to different areas of the patterns of marks, wherein the different printing densities of fluorescent spots are based on the different printing densities of the patterns of marks and on a size of the hidden features; and
   printing the print request on the print media using a printing device of the printing system to produce the printed output.

16. The method according to claim 15, wherein the altering further comprises adding relatively higher printing densities of the fluorescent spots to areas of the patterns of marks having relatively higher printing densities of the patterns of marks and adding relatively lower printing densities of the fluorescent spots to areas of the patterns of marks having relatively lower printing densities of the patterns of marks.

17. The method according to claim 15, wherein the altering further comprises adding relatively lower printing densities of the fluorescent spots to the different areas of the patterns of marks as relative feature sizes of the hidden features formed by the fluorescent spots increases.

18. The method according to claim 15, wherein the altering further comprises establishing the different printing densities of the fluorescent spots relative to the different printing densities of the patterns of marks and the size of the hidden features to cause the hidden features to only be visible when viewed under ultraviolet light.

19. The method according to claim 15, wherein the altering further comprises identifying ones of the different areas of the pattern of marks to not receive the hidden features based on the printing density and printing gamut of the different areas of the pattern of marks.

20. The method according to claim 15, further comprising:
   scanning the printed output using a scanner of the printing system to produce a scan of the printed output;
   determining if the hidden features are visible in the scan of the printed output; and
   repeating the altering by reducing the printing densities of the fluorescent spots based on the hidden features being visible in the scan of the printed output.

\* \* \* \* \*